(12) United States Patent
Beretta

(10) Patent No.: US 6,231,803 B1
(45) Date of Patent: May 15, 2001

(54) METHOD FOR STRETCHING PLASTIC NETS AND GRIDS APPARATUS FOR PERFORMING THE METHOD

(75) Inventor: Mario Beretta, Sirtori (IT)

(73) Assignee: Tenax S.p.A., Vigano' (IT)

( * ) Notice: Subject to any disclaimer, the term of this patent is extended or adjusted under 35 U.S.C. 154(b) by 0 days.

(21) Appl. No.: 09/181,542

(22) Filed: Oct. 29, 1998

(30) Foreign Application Priority Data

Nov. 4, 1997  (EP) .................................................. 97830561

(51) Int. Cl.$^7$ ......................... B29C 55/00; B29C 55/02; B29C 55/16; B29C 70/58
(52) U.S. Cl. ................... 264/479; 264/177.2; 264/210.7; 264/288.8; 264/290.2; 264/489; 264/491; 264/DIG. 81; 425/174.4; 425/174.8 R
(58) Field of Search ..................... 264/474, 479, 264/489, 171.1, 177.2, 210.2, 210.7, 288.8, 290.2, DIG. 81, 475, 491; 425/174.4, 174.8 E, 174.8 R

(56) References Cited

U.S. PATENT DOCUMENTS

| | | | |
|---|---|---|---|
| 3,951,904 | * 4/1976 | Tomonaga | 428/134 |
| 4,265,956 | * 5/1981 | Colijn | 428/134 |
| 4,336,638 | * 6/1982 | Mercer | 26/99 |
| 4,497,759 | * 2/1985 | Nakagawa et al. | 264/26 |
| 4,567,011 | * 1/1986 | Nalle, Jr. | 264/504 |
| 4,590,029 | * 5/1986 | Mercer | 264/156 |
| 4,906,172 | * 3/1990 | Stewart | 425/174.4 |
| 5,259,097 | 11/1993 | Aihara et al. | 26/92 |
| 5,589,260 | * 12/1996 | Zvi et al. | 428/327 |

FOREIGN PATENT DOCUMENTS 0 113 203    7/1984  (EP) .
2 646 124   10/1990  (FR) .

OTHER PUBLICATIONS

Patent Abstract of Japan, vol. 012, No. 027 (M–662), Jan. 27 1988 & JP 62 181123 (Nippon Telegr & Teleph Corp) Aug. 8, 1987, *abstract*.
Database WPI Section Ch, Week 8925 Derwent Publications Ltd., London GB; Class A97, AN 89–184051—XP002060142 & JP 01 123917 (Nippon Oil Seal Ind Co Ltd) May 16, 1989 *abstract*.
Database WPI Section Ch, Week 7930 Derwent Publications Ltd., London GB; Class A17, AN 79–55129B—XP002060143 & JP 54 073841 (Furukawa Electric Co Ltd) Jun. 13, 1979 *abstract*.
Patent Abstract of Japan, vol. 010, No. 047 (M–456), Feb. 25, 1986 & JP 60 198211 (Toyo Boseki KK; Others; 01) Oct. 7, 1985, *abstract*.

* cited by examiner

Primary Examiner—Jan H. Silbaugh
Assistant Examiner—Michael I. Poe
(74) Attorney, Agent, or Firm—Guido Modiano; Albert Josif; Daniel O'Byrne

(57) ABSTRACT

A method for stretching plastic nets and grids having the peculiarity that it consists in subjecting the product to be stretched to irradiation with electromagnetic waves with a wavelength above the infrared range, so as to heat the product by dielectric loss, and in subjecting the product to traction in order to produce stretching in at least one direction. The method allows to substantially improve the ability of the polymer to absorb the energy in order to profitably perform the stretching process.

13 Claims, 2 Drawing Sheets

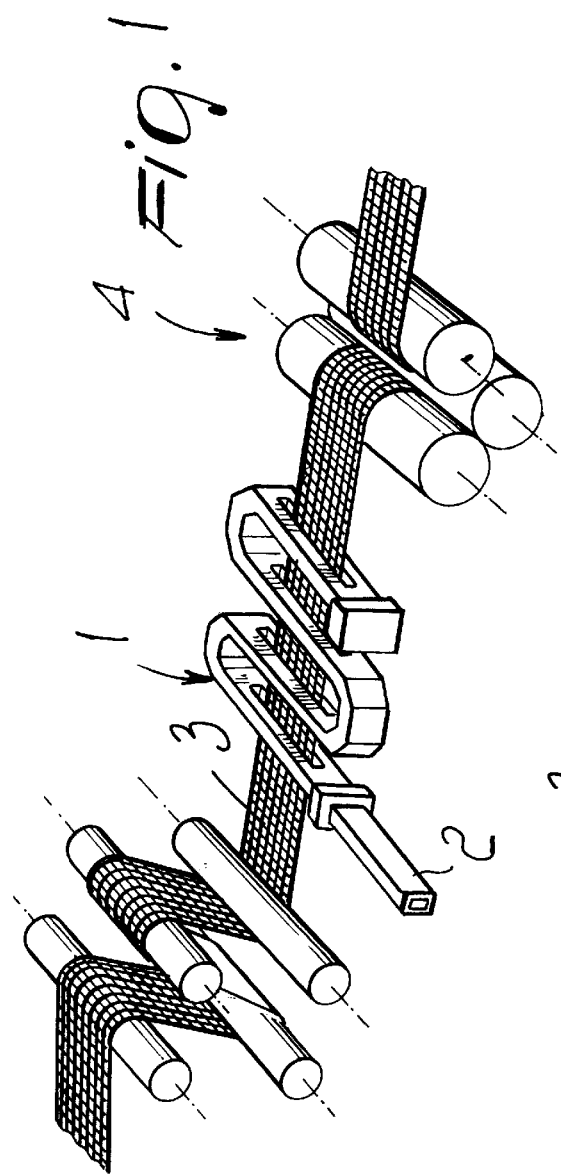
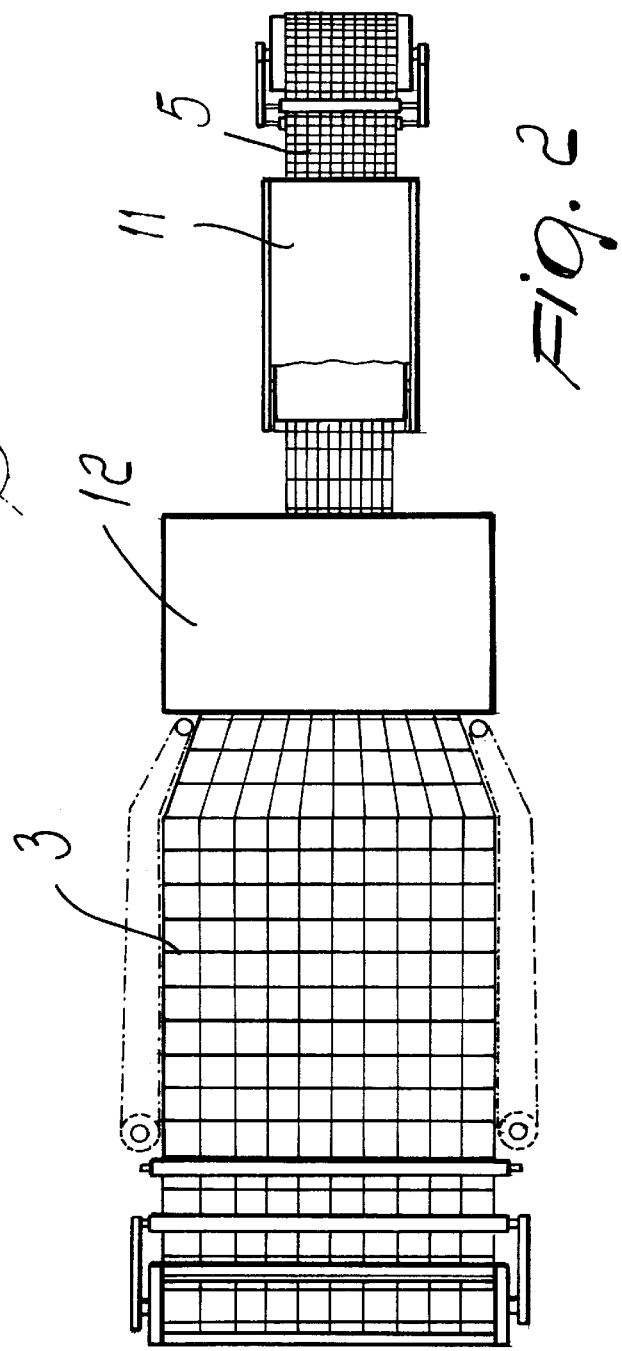

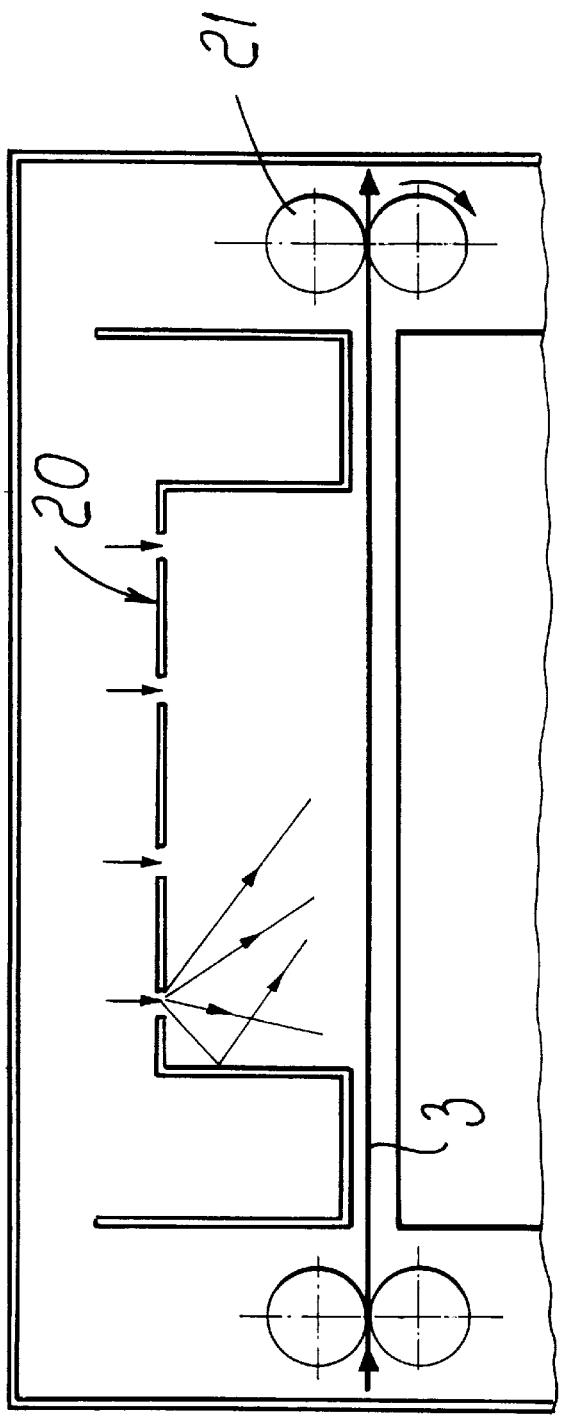
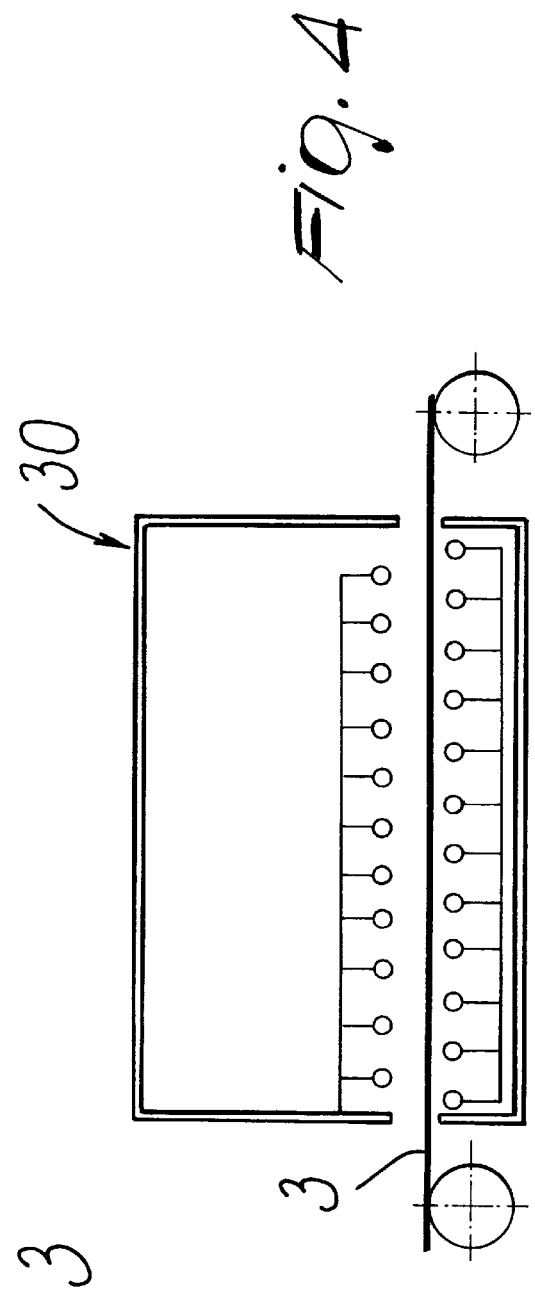

METHOD FOR STRETCHING PLASTIC NETS AND GRIDS APPARATUS FOR PERFORMING THE METHOD

BACKGROUND OF THE INVENTION

The present invention relates to a method for stretching plastic nets and to the apparatus for performing the method.

The expression "stretching method" designates the modification, by mechanical action (stretching), of the morphological structure of a polymeric material in order to obtain a specific performance, such as an increase in pulling strength and in the elasticity modulus of the product and a decrease in breaking elongation.

It is known that in order to perform the stretching method the material is first heated, directly raising the temperature of its outer surface and then gradually increasing the temperature of its inner layers by conduction.

Systems based on water, air, hot rollers and infrared radiation are used to perform heating. In particular, all currently known stretching systems utilize the principle of heat conductivity to transfer heat from the outer layers to the inner layers of the product.

Accordingly, it is necessary to produce a difference in temperature between the inner layer and the outer layer in order to produce heat exchange and a certain variable amount of time is required to provide a uniform distribution of the temperature inside the material, in order to obtain the intended thermal conditions.

Conventional systems suffer the drawback that they frequently damage the surface of the products subjected to high temperature for a certain time, i.e., for the time required to make the heat uniformly penetrate the inner layers.

The temperature difference between the inner and outer layers causes creep in the overheated outer layers and cracks and fissures in the insufficiently heated inner layers.

Another drawback is further constituted by the intense internal stresses in the presence of sharp temperature gradients caused by the difference in temperature between the outer and inner layers both during heating and during cooling.

These stresses cause breakages or less than optimum alignments during stretching; accordingly, the finished product can be affected by the damage caused by the systems currently being used and can have undesirable cracks, brittleness, elongations and discontinuities.

Another drawback arising from the use of known systems is the large amount of energy required to heat plastic materials with current conduction systems, which often entail problems in dissipating the heat in the heat-producing means.

The above-mentioned drawbacks worsen as the thickness of the material to be heated increases and as the differences in thickness of the cross-sections of the product increase.

Temperature adjustment in known stretching systems also does not allow precise and immediate variations in the temperature of the product to be stretched, owing to the thermal inertia that is typical of the heating system used so far.

Another drawback is also caused by the fact that in order to efficiently vary the temperature of the entire product it is necessary to vary the temperature of the heating means, which in turn propagates, with its specific inertia, the variation to the surface of the net.

In order to try to improve stretching conditions, in known systems the materials are stretched substantially during the heating of the net, since the degree of dissipation of the superficially absorbed heat is high.

In known systems, energy utilization is not strictly proportional to the amount of polymer to be heated, since in any case it is necessary to bring, and keep, the space wherein stretching is performed to a temperature such that the conduction process transfers a sufficient amount of heat to the innermost layers.

Known stretching system have the limitation that it is necessary to adapt the stretching speed to the mass of product to be stretched, since the temperature of the heating means cannot be raised further without severely damaging the net, unless resorting to expensive contrivances which increase the heat exposure time by extending the space traveled inside the heating means.

Water-based heating also entails the need to dry the product and to continuously replace the amount of water that has evaporated and been removed.

Air-based heating entails using large amounts of power in order to keep the temperature constant, so as to contrast thermal dissipations; this system also forces stretching of plastic materials at low speed in order to allow a uniform and useful heat conduction effect, consequently reducing productivity.

Heating with metal rollers which are internally heated by means of diathermic oil entails the problem of poor heat transmissivity, which worsens in uneven materials wherein contact is limited only to the protruding surfaces; uneven heat propagation also causes drawbacks during stretching and consequent defects in the final product.

Heating by infrared radiation has the drawback that it directly heats only the surface layer of the material and does not produce uniform heating per unit mass; infrared radiation also entails the drawback that it is ionizing and as such is dangerous to the operator.

Examples of stretching obtained with conventional heating systems are disclosed in U.S. Pat. No. 4,152,479 and in GB-2035191, GB-2073090 and GB-135901.

Plastic materials have already been subjected, in other applications, to heating by means of electromagnetic waves and more particularly radio frequency waves or microwaves. Many plastics, differently from those used in the present invention, are in fact classified as dielectric materials which have the property that they become polarized because their structure has strong electron bonds. Accordingly, when they are placed in an electromagnetic field which varies with radio frequencies or microwave frequencies, plastic materials such as PET, POM and others undergo continuous polarization changes which can increase the temperature of the material.

Examples of teachings related to these applications arise from JP-6246619 and JP-60220730. Differently from the present invention, these patents do not provide for the heating of polyolefins, which constitute the base polymers used by the present invention. These inventions also use a heating step performed with conventional means, which as mentioned can cause the above-cited drawbacks.

It is also currently known to stretch, with heating, by dielectric loss, only strands or films of polyethylene characterized by very low thicknesses and by a uniform and constant thickness (JP-60173114 and JP-57193513).

The thicknesses, the lack of regions that interconnect the strands and the constant thickness and cross-section deeply differentiate the state of the art from the present invention.

Finally, the materials employed in the present invention, namely polyolefins, were hitherto substantially not capable of being heated by dielectric loss.

Since the ability to heat up is in fact linked to a coefficient, known as loss factor, it can be seen that for polyethylene said factor is between 0.001 and 0.0004, while it is between 0.003 and 0.014 for polypropylene, showing an almost nil heating ability; indeed, these materials are applied inside radiofrequency microwave ovens as supports which indeed do not heat up.

SUMMARY OF THE INVENTION

The aim of the present invention is to eliminate the drawbacks mentioned above in conventional hot-stretching methods by providing a method in which it is possible to heat a plastic product uniformly and simultaneously in all the layers of its mass.

Within the scope of this aim, a particular object of the invention is to provide a method which allows to achieve optimum stretching in all the layers of the mass that forms the plastic material and particularly to subject the macromolecules to uniform alignment along the stretching direction, since the difference in temperature between the layers is eliminated, the temperature gradient is eliminated, and the formation of cracks in the inner layers and of creep deformations in the outer layers is prevented, also because the tensions inside the material, caused by thermal gradients, and breakages by shearing of the inner parts of the plastic product are decreased together with dimensional nonuniformities caused by uneven heating.

Another object of the present invention is to provide a method in which thermal transients, i.e., the time required to vary the temperature inside the product, are reduced drastically, with the advantage of being able to provide a substantially instantaneous leveling of the intended temperature and to keep it at the set value during stretching.

This aim, these objects and others which will become apparent hereinafter are achieved by a method for stretching plastic nets, characterized in that it consists in subjecting the product to be stretched to irradiation with electromagnetic waves with a wavelength above the infrared range, so as to heat said product by dielectric loss, and in subjecting the product to traction in order to produce stretching in at least one direction.

BRIEF DESCRIPTION OF THE DRAWINGS

Further characteristics and advantages of the present invention will become apparent from the description of a preferred but not exclusive embodiment of a method and an apparatus for stretching plastic nets, illustrated in the accompanying figures, wherein:

FIG. 1 is a schematic view of the longitudinal stretching of a plastic net which is heated by passing through a cavity that contains microwaves;

FIG. 2 is a schematic view of a machine for in-line longitudinal and transverse stretching;

FIG. 3 is a schematic view of an example of application of a microwave source to a stretching process;

FIG. 4 is a schematic view of an example of application of a radiofrequency source to a stretching process.

DESCRIPTION OF THE PREFERRED EMBODIMENTS

First of all, it should be noted that in order to perform the dielectric-loss stretching method it has been observed that it is necessary to use a polymeric material whose loss factor is not less than 0.01.

Having found that polyolefins (polypropelene (PP) and polyethylene (PE)), of which the grid-like material used for nets and geotechnical products are normally made, are not sensitive to irradiation with electromagnetic waves and do not undergo a temperature increase which is adapted to perform stretching, the present invention seeks to allow stretching with heating by dielectric loss even in these materials.

It has been found experimentally that in order to achieve heating by dielectric loss with polyolefins and the like it is necessary to add additives to the polyolefin base mix in order to achieve a degree of absorption of the energy carried by magnetic waves at radio and microwave frequencies such that the material undergoes a uniform heating which is sufficient for the correct execution of the stretching method.

The kind of additive to be used in order to allow stretching is one capable of increasing the loss factor to a value of at least 0.01; the additive is added in a percentage between 1 and 30% of the mix.

It has been found experimentally that graphite or carbon black and other semiconductors such as silicon, materials with polar molecular structures such as phenol-formaldehyde, PVC, polyamides and cellulose esters, are effective additives.

Carbon black or graphite, added in a percentage between 3% and 20%, have been found to be ideal.

Experimentally, a 1200 nominal watt microwave oven was used inside which 300 grams of product, obtained from a mix formed by polypropylene with the addition of approximately 5% graphite or carbon black at the temperature of 21° C., was introduced.

The oven was set to maximum power for approximately 70 seconds and at the end of the cycle it was noted that the temperature of the product, regardless of its shape, was approximately 80° C. as a whole; this temperature is ideal for stretching.

The type of microwave, as shown in FIG. 1, provides for the introduction of energy- and direction-modulated microwaves inside a coil 1 by means of the iris diaphragm 2, which provides uniform irradiation on the net 3 that passes through the coil 1, uniformly irradiating said grid.

The net 3, struck by the electromagnetic wave, absorbs its energy, undergoing a uniform and simultaneous increase in temperature in all its layers and causing a gradual loosening of the molecules.

The net 3, at room temperature, passes through the coil 1 and, after undergoing heating by dielectric loss, stretches uniformly in the strand and in the node, according to the pulling speed set by the rollers 4.

FIG. 2 illustrates an apparatus for stretching a plastic grid 5, which has a first station 11 and a second station 12 which produce high-frequency heating, combined with an apparatus which performs preliminary longitudinal stretching and then performs stretching transversely to the grid 5.

The non-oriented plastic grid 5 is passed inside the oven 11, where a high-frequency electric field is provided, in the radiofrequency or microwave range, and longitudinal stretching is performed at the exit in order to introduce the product in a second high-frequency heating station, at the outlet whereof the product is subjected to stretching in a transverse direction.

FIG. 3 illustrates a microwave source, generally designated by the reference numeral 20, which irradiates the net 3, which is subjected to stretching by means of traction rollers 21.

Likewise, FIG. 4 illustrates a radiofrequency oven, designated by the reference numeral 30, which uniformly irradiates the material that is passed inside it.

The above-described invention is based on introducing the grid-like material in a radio- or microwave-frequency variable electric field, in which heat is generated inside the mass of strands and nodes by rapid reversal of the polarization of the individual molecules.

Surprisingly, the temperature rises uniformly and simultaneously throughout the net, regardless of the existing thickness variation, so that the heating that is performed allows to achieve, in the irradiated regions, optimum stretching in all the layers of the strands and nodes, since the macromolecules undergo uniform and simultaneous elongation in the stretching direction.

The advantages of the present invention are particularly evident in the case of semifinished components having considerable thickness variations which mainly occur in the strand connecting regions.

The possibility of achieving uniform heating prevents molecular orientation from occurring first in the thinner regions and then advancing towards the thicker ones and instead allows it to occur simultaneously in all the regions, and the molecules, subjected to stretching, begin to orient themselves simultaneously.

Accordingly, a uniform and optimum molecular orientation is obtained, which avoids the occurrence of breakages in the region where the strands and the node mutually connect during stretching.

The possibility to achieve optimum temperature distribution allows to control one of the fundamental parameters of stretching and of the net, greatly minimizing the risk of weakening the node and of webbing, as disclosed for example in IT-867426.

The kind of heating according to the invention therefore eliminates the difference in temperature among layers, indeed in the presence of those differences in cross-section and thickness that currently cause several problems, and the temperature gradient and the formation of cracks in the inner layers and of creep deformation in the outer layers are eliminated.

The uniform heating of the entire mass of the net also provides the advantage of eliminating the tensions inside the material caused by thermal gradients, which are otherwise inevitable with conventional heating systems, which can cause unwanted weakenings of the structure of the net.

During stretching, breakages by shearing of the internal parts of the plastic net and size irregularities caused by uneven elongation are no longer found.

Heating by dielectric loss allows to drastically reduce thermal transients, i.e., the period of time required to vary the temperature inside the net, providing a substantially instantaneous adjustment of the intended temperature and the possibility to maintain the set value during stretching.

The extreme precision in the adjustment of the energy transmitted to the net and the possibility of an irradiation which is optionally localized to single parts or sections advantageously allows to perform stretching even for net portions, leaving the remaining portions substantially not oriented.

The flexibility of the system allows to stretch plastic nets at uniform or modulated intervals, according to the required stretching criteria.

Another advantage arising from the invention is the possibility to eliminate the time and cost required to heat the conventional heating means (water, air, heated metal rollers), since system startup times are entirely eliminated, providing a considerable energy saving and a reduction in production times, with the possibility to stretch the net at the same time as system startup.

The present invention also allows to effectively perform stretching both during heat irradiation and during a subsequent step, since the energy accumulated as heat in the innermost layers ensures the persistence of the stretching conditions, especially in the thicker regions, such as the node, where cooling is slow and gradual from the outermost layers to the innermost ones.

The invention also eliminates one of the severe drawbacks that can occur when stretching is halted due to unexpected events during production, namely net overheating.

The possibility to adjust and deactivate the delivery of energy and the consequent interruption of the application of heat eliminates the risk of overheating and damage to the plastic net.

Another advantage of the present invention also resides in the fact that it is possible to perform stretching in less space and in a shorter time for an equal mass.

Stretching operations can be performed at a higher stretching speed than allowed by conventional systems, since it is possible to uniformly introduce into the net the heat required for stretching, over a period of time which is set according to the requirements of the operator, modulating proportionally the amount of energy to be applied.

The novelty is also introduced, with respect to conventional stretching methods, to perform stretching in a small space in order to provide molecular orientation; the molecules, if heated appropriately and uniformly, are in fact capable of undergoing a high stretch ratio inside a compact stretching machine without subjecting the product to unwanted shearing or tearing due to the sudden and intense traction.

The stretching rate can be increased conveniently as a function of the mass of the net but independently of thickness variations along the net, since it is a function of the amount of energy to be irradiated.

The short time during which stretching is performed advantageously allows to achieve a considerable increase in plant productivity, with an energy consumption which is proportional to the mass of product to be stretched and to the production rate that the operator intends to use.

By way of example, it should be noted that just 100 kW of installed power allow to double the productivity of a hot-air transverse stretching machine which is 50 m long.

By producing a substantially uniform heating inside the mass, advantages are obtained which increase as the variation in the cross-section of the net increases, as the thickness of the net increase, and as the thickness variations along the net increase.

Drastic reductions in the manufacturing and maintenance costs of stretching systems are also achieved by virtue of their size, the reduced complexity of ancillary equipment and the lower thermal stresses to which the entire equipment is subjected.

The invention thus conceived is susceptible of numerous modifications and variations, all of which are within the scope of the inventive concept.

All the details may also be any according to requirements.

In practice, the materials employed, so long as they are compatible with the specific use, as well as the contingent shapes and dimensions, may be any according to requirements.

What is claimed is:

1. A method for stretching plastic nets or grids having mutually interconnected strands and nodes with thickness variations comprising thinner regions and thicker regions, and being made of polymeric material with a polyolefin base mix, the method comprising:

adding additives to the polyolefin base mix of the polymeric material of the plastic nets or grids in order to produce, in the polymeric material, a loss factor of more than 0.01;

subjecting the plastic nets or grids to be stretched to irradiation with electromagnetic waves with a wavelength above the infrared range, so as to heat said product by dielectric loss, and subjecting the plastic nets or grids to traction in order to produce stretching in at least one stretching direction with stretching of all of the layers of the strands and the nodes and uniform and simultaneous elongation of the macromolecules in the stretching direction and simultaneous molecular orientation in the thinner and thicker regions.

2. A method according to claim 1, wherein said irradiation is performed by microwave electromagnetic waves.

3. A method according to claim 1, wherein said irradiation is performed by radio frequency electromagnetic waves.

4. A method according to claim 1, comprising the step of heating discrete portions of said product to subsequently stretch said discrete portions without orienting remaining portions of the product.

5. A method according to claim 1, wherein the step of adding additives to a polyolefin base mix produces, in the polymeric material, a loss factor of more than 0.01 and less than 0.07.

6. A method according to claim 5, wherein said additives are comprised in a percentage between 1 and 30%.

7. A method according to claim 5, wherein said additives are constituted by graphite or carbon black.

8. A method according to claim 5, wherein said additives are constituted by semiconductors.

9. A method according to claim 8, wherein said semiconductors are constituted by silicon.

10. A method according to claim 5, wherein said additives are constituted by materials having polar molecular structures.

11. A method according to claim 10, wherein said polar molecular structures are constituted by phenol-formaldehyde.

12. A method according to claim 10, wherein said polar molecular structures are constituted by PVC.

13. A method according to claim 10, wherein said polar molecular structures are constituted by cellulose esters and polyamides.

* * * * *

UNITED STATES PATENT AND TRADEMARK OFFICE
CERTIFICATE OF CORRECTION

PATENT NO.     : 6,231,803 B1
DATED          : May 15, 2001
INVENTOR(S)    : Mario Beretta Page 1 of 1

It is certified that error appears in the above-identified patent and that said Letters Patent is hereby corrected as shown below:

<u>Title page,</u>
Item [30] Foreign Application Priority Data
Nov. 4, 1997    (EP)    ... ... ... ... ... ... ... ... 97830567

Signed and Sealed this

Twenty-sixth Day of February, 2002

Attest:

JAMES E. ROGAN
*Attesting Officer*          *Director of the United States Patent and Trademark Office*